United States Patent [19]

Sprague

[11] 4,204,230

[45] May 20, 1980

[54] HIGH RESOLUTION INPUT SCANNER USING A TWO DIMENSIONAL DETECTOR ARRAY

[75] Inventor: Robert A. Sprague, Saratoga, Calif.

[73] Assignee: Xerox Corporation, Stamford, Conn.

[21] Appl. No.: 954,507

[22] Filed: Oct. 25, 1978

[51] Int. Cl.² ............................................... H04N 3/14
[52] U.S. Cl. ..................................... 358/213; 358/212
[58] Field of Search ................................ 358/213, 212

[56] References Cited

U.S. PATENT DOCUMENTS 4,071,853  1/1978  Yamanaka ............................. 358/213

Primary Examiner—Richard Murray

[57] ABSTRACT

In an input scanner the subject to be scanned is translated in a cross scan direction relative to a two dimensional, integrated CCD detector array or the like so that successive full scan length segments of the subject are sequentially imaged onto the array. The photosensitive zones of the detectors within the different rows of the array are laterally staggered so that each of the detectors responds to a specific spatially predetermined resolution element or pixel of each scan line. The detectors generate data samples in response to those pixels, but the data samples representing adjacent pixels of any given scan line are distributed over multiple rows of the array in accordance with a two dimensional distribution function which depends on the staggering of the photosensitive zones of the detectors. If multiple scan lines are simultaneously imaged onto the array, buffered destaggering electronics, operating in accordance with the inverse of that distribution function may be utilized to arrange the data samples representing adjacent pixels in a serial video data stream having a conventional raster scan format. If, however, only one scan line is imaged onto the array per imaging frame, the data samples may be directly read out of the detectors in a scan line-by-scan line serial video data stream.

28 Claims, 11 Drawing Figures

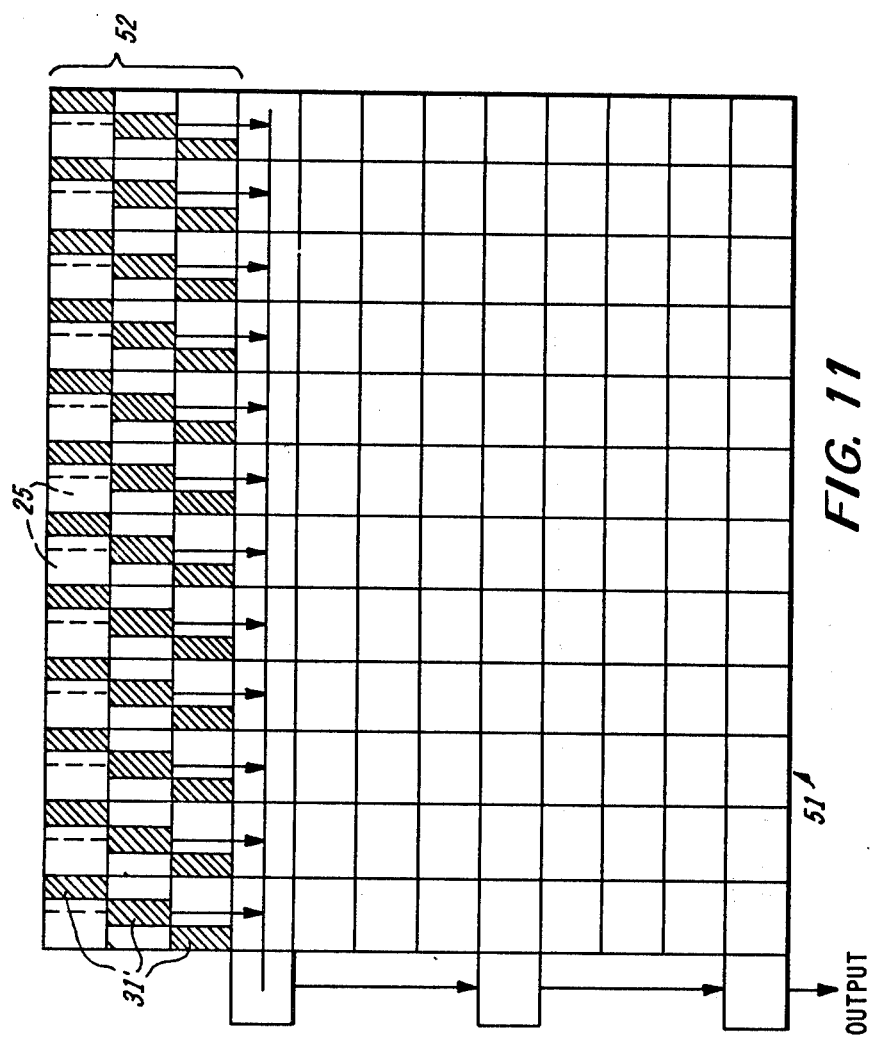

HIGH RESOLUTION INPUT SCANNER USING A TWO DIMENSIONAL DETECTOR ARRAY

BACKGROUND OF THE INVENTION

This invention relates to input input scanners and, more particularly, to methods and means for achieving high resolution raster input scanning through the use of low resolution, two dimensional image sensors, such as integrated charge coupled device (CCD) area arrays.

Others have already recognized that charge coupled devices (CCD's) may be advantageously utilized as photosensitive detector elements for raster input scanners. It has been shown that many mutually independent CCD's can be formed on a single chip of semiconductive material, such as silicon. Nevertheless, the chip lengths and the CCD detector densities which can be obtained using state of the art semiconductor fabrication techniques are still not sufficient to permit the manufacture of an integrated linear CCD detector array having the high line scanning resolution capability demanded of some raster input scanners.

In view of that limitation, some thought has been given to the seemingly simple expedient of stringing a plurality of linear integrated CCD arrays together to form a longer, composite linear detector array. However, it has been found that it is difficult to achieve and maintain the alignment of the individual integrated arrays that is essential to the linearity of the composite array. Another suggestion which has been made for applying integrated CCD detector arrays to high resolution raster input scanning involves optically interlacing or stitching the detector elements within several rows of a two dimensional integrated array to perform the scanning. See, for example, U.S. Pat. No. 4,080,633 of Gary K. Starkweather, which issued Mar. 21, 1978 to the assignee of this application. That is an effective approach, but it suffers from the disadvantage of requiring relatively complex and difficult to align optics for imaging the subject which is to be scanned onto the detector array.

SUMMARY OF THE INVENTION

Accordingly, an object of the present invention is to provide relatively economical and reliable methods and means for performing high resolution input scanning through the use of low resolution, two dimensional image sensors.

One of the more important objects of this invention is to provide improved methods and means for applying low resolution, two dimensional photosensitive detector arrays to high resolution raster input scanning. However, it should be understood that certain of the broader aspects of the invention apply to input scanning generally, without specific limitation to the scan line-by-scan line serial scanning format of a conventional raster input scanner or to the use of arrays of mutually independent detector elements. For example, a two dimensional image sensor, such as a vidicon, could be used in carrying out certain of the basic features of this invention.

More particularly, an object of the present invention is to provide relatively straightforward and readily maintained methods and means for applying low resolution, two dimensional integrated CCD detector arrays and the like to high resolution input scanning. In even greater detail, a related object is to provide relatively economical and reliable electro-optic methods and means for performing high resolution raster input scanning through the use of low resolution, two dimensional, integrated CCD detector arrays and the like.

To carry out those and other objects of the invention, the subject to be scanned is translated in a cross scan direction relative to a two dimensional, integrated CCD detector array or the like so that successive full scan line length segments of the subject are sequentially imaged onto the array. In accordance with this invention, provision is made for laterally staggering the photosensitive zones of the detectors within the different rows of the array so that each of the detectors responds to a specific spatially predetermined resolution element or pixel of each scan line. The detectors generate data samples in response to those pixels, but the data samples representing adjacent pixels of any given scan line are distributed over multiple rows of the array in accordance with a two dimensional distribution function which depends on the staggering of the photosensitive zones of the detectors. If multiple scan lines are simultaneously imaged onto the array, buffered destaggering electronics, operating in accordance with the inverse of that distribution function, may be utilized to arrange the data samples representing adjacent pixels in a sequential manner thereby providing the scan line-by-scan line serial video data stream output format of a conventional raster input scanner.

BRIEF DESCRIPTION OF THE DRAWINGS

Still further objects and advantages of this invention will become apparent when the following detailed description is read in conjunction with the attached drawings, in which:

FIG. 11 is a functional diagram of a fully integrated equivalent to the buffered destaggering electronics illustrated in FIG. 10.

DETAILED DESCRIPTION OF THE ILLUSTRATED EMBODIMENTS

While the invention is described in some detail hereinbelow with specific reference to certain illustrated embodiments, it is to be understood that there is no desire to limit it to those embodiments. On the contrary, the intent is to cover all modifications, alternatives, and equivalents falling within the spirit and scope of the invention as defined by the appended claims.

Figure 1:
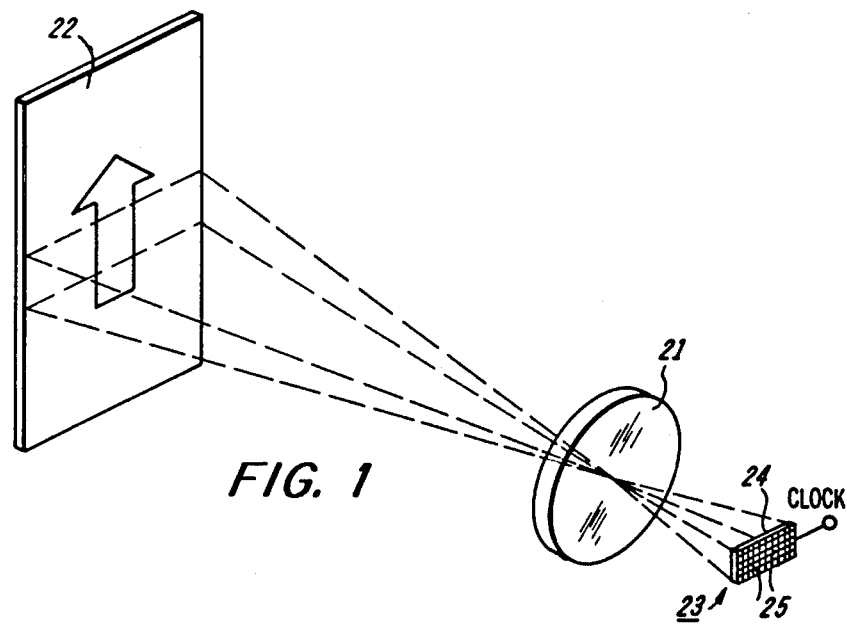
FIG. 1 is a schematic illustration of one embodiment of the present invention.

Turning now to the drawings, and at this point especially to FIG. 1, there is a lens 21 for sequentially imaging successive full scan line length segments of a suitable illuminated subject 22 onto a two dimensional, integrated CCD detector array 23 via a staggered aperture mask 24. To position the successive segments of the subject 22 for imaging onto the array 23 at a predetermined framing rate, the subject is moved at a predetermined rate (by means not shown) in a cross scan direction relative to the array 23, as indicated by the arrow. As a general rule, the width of the subject 22, as measured in the line scanning direction, is substantially greater than the length of the array 23, as measured in that same direction. Thus, the magnification of the lens 21 is selected so that full width or scan line length segments of the subject 22 are imaged onto the array 23.

The array 23 is at least an n×N array of CCDs. In other words, it comprises N more or less equidistantly spaced and mutually independent CCD detectors 25 in each of n successive rows. In the illustrated embodiments, the detectors 25 are integrated on a single chip of semiconductive material, such as silicon. Accordingly, the number N of mutually independent CCD detectors 25 which may be provided in each row of the array 23 is limited by the maximum chip length and the maximum detector density which can be achieved through the use of state of the art semiconductor fabrication techniques.

More than enough resolution elements or pixels to provide a high resolution definition of a scan line are imaged onto a single row of detectors 25. However, the limited number N of CCD detectors 25 which may be formed in any one row of the array 23 is insufficient to obtain high resolution input scanning through the use of just one row of detectors 25.

In accordance with the present invention, to perform high resolution input scanning despite the characteristically low line resolution capabilities of the array 23, the photosensitive zones of the detectors 25 are laterally staggered or offset from one another in the line scanning direction so that individual pixels from each scan line are separately imaged onto respective ones of the detectors 25 in one or another of the rows of the array 23. That, of course, greatly increases the number of pixels which are detected and converted into corresponding data samples per scan line, thereby providing increased line scanning resolution. The basic concept is unaffected by whether the individual pixels which are imaged onto the detectors 25 are from abutting segments of the scan line as in a fully sampled case, overlapping segments of the scan line as in an undersample case.

The individual pixels of each scan line are distributed while being imaged onto the detectors 25 of the array in accordance with a two dimensional distribution function which is dependent on the staggering of the photosensitive zones of the detectors 25. Pixels of multiple scan lines may be simultaneously imaged onto different ones of the detectors 25, but all of the pixels of each scan line are detected with a predetermined number of frames. Each of the detectors 25 responds to a spatially predetermined one of the pixels of each scan line. Consequently, clock pulses (supplied by means not shown) are applied to the array 23 to shift or read out the data samples generated by the detectors 25 at the line scanning or framing rate. Multiple clock pulses may be supplied per frame to serially read out the data samples from the detectors 25 in successive columns or rows of the array 23. Alternatively, there may be one clock pulse per frame to simultaneously read out the data samples from all the detectors 25 in parallel. In either case, the number of frame require to accumulate a complete set of data samples for a scan line is dependent on the number of scan lines which are imaged onto the array 23 per frame.

Figure 2:
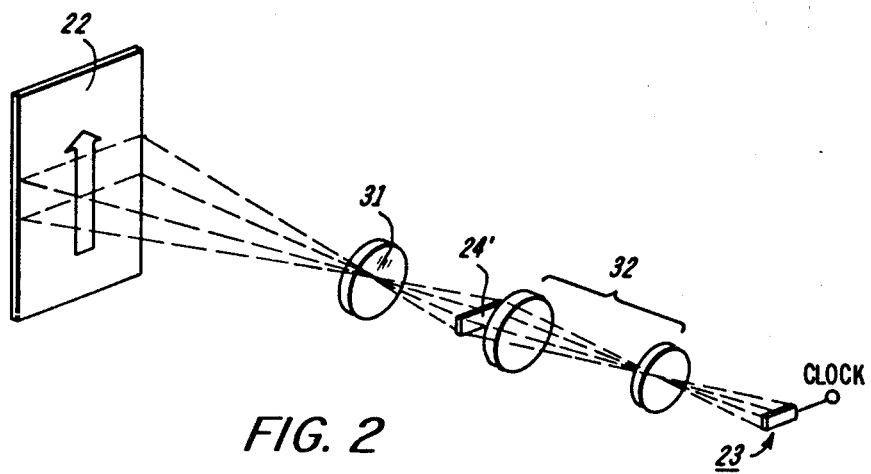
FIG. 2 is a schematic illustration of another embodiment of this invention.

In keeping with this invention, to laterally stagger the photosensitive zones of the detectors 25 within the successive rows of the array 23, the mask 24 is an optically opaque screen which is formed to provide laterally staggered, optically transparent apertures 31 (FIGS. 3-6) in alignment with respective ones of the detectors 25 in successive rows of the array 23. As shown in FIG. 1, the mask 24 may be a metallized layer deposited directly on the array 23. Alternatively, as shown in FIG. 2, the mask 24' may be a free standing component which is relay imaged onto the array 23 by the imaging lens 31 and suitable relay optics 32. Indeed, there are several other approaches which can be used for laterally staggering the photosensitive zones of the detectors 24 within the successive rows of the array 23. For example, the boundary zones between the detectors 24 in successive rows of the array 23 could be staggered and the width of the boundary zones could be controlled by applying suitable biasing voltage to control the width of the photosensitive zones of the detectors 25. In other words, the masks 24 and 24' simply represent one technique for laterally staggering the photosensitive zones of the detectors 25 in the successive rows of the array 23. Nevertheless, it should be noted that the advantage of relay imaging the mask 24' onto the array 23 is that the mask 24' may be substantially larger than the array 23, thereby simplifying the mask fabrication process, particularly for higher resolution applications.

Figure 3:
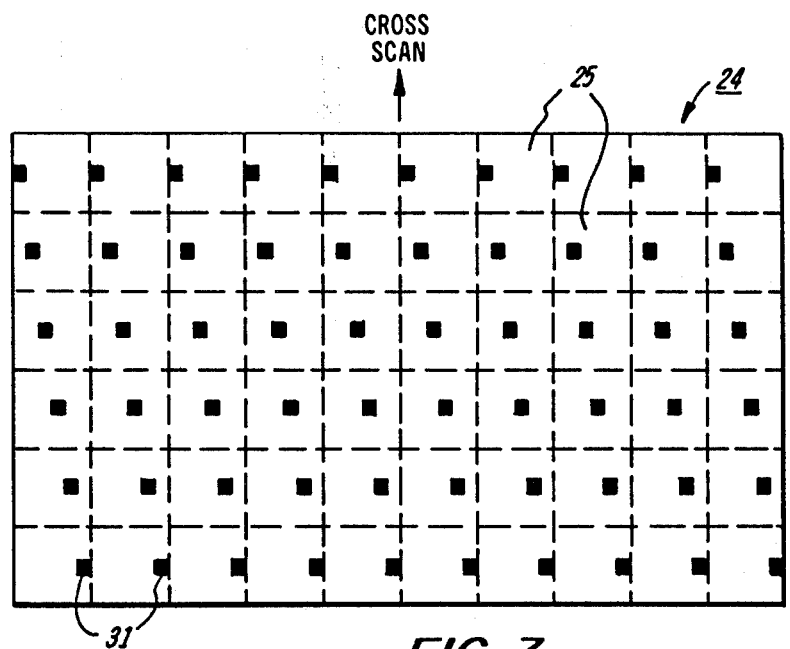
FIGS. 3–7 are layout diagrams of staggered aperture masks which are suitable for use in the embodiments shown in FIGS. 1 and 2.
Figure 4:
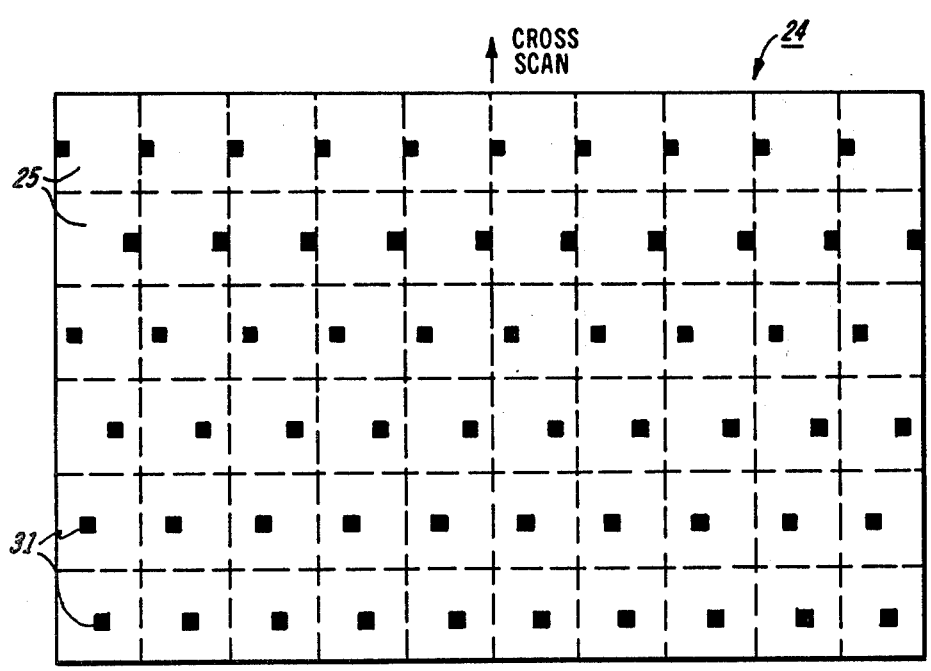
Figure 5:
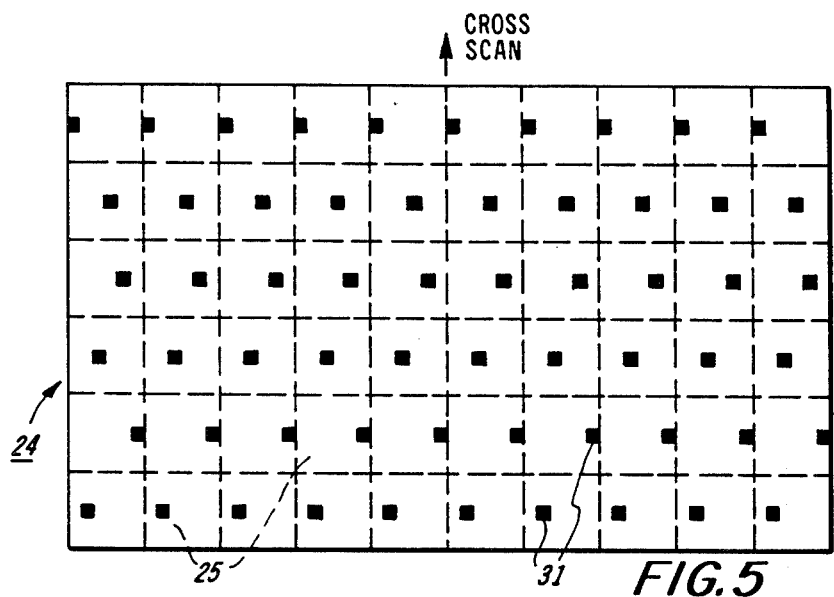

FIGS. 3-5 illustrate some of the staggered aperture patterns which may be used with the mask 24 of FIG. 1. Of course, the same patterns are applicable to the mask 23' of FIG. 2 and to any of the other techniques which can be employed to laterally stagger the photosensitive zones of the detectors 25.

The progressive staggering pattern shown in FIG. 3 causes the adjacent pixels of a scan line to be imaged onto detectors 25 in adjacent rows of the array 21. It simplifies the destaggering electronics which are required to achieve a raster scanning format, but it is not optimal from the standpoint of its sensitivity to alignment errors or scanning errors. If alignment errors, such as an angular error in the motion of the subject 22 relative to the array 23, are of primary concern, the pattern illustrated in FIG. 4 is especially attractive because it minimizes the average cross scan displacement of apertures 31 which are adjacent in the line scanning direction. On the other hand, if visual banding in the output image (not shown) is particularly objectionable, a pseudo-random staggering pattern such as is shown in FIG. 5 may be desirable because it causes any line scanning errors to be more or less randomly distributed over several rows in the data. In short, the lateral staggering of pattern for the photosensitive zones of the detectors 25 in the successive rows of the array 23 may be selected to accomodate any one of several different requirements.

FIGS. 3-5 illustrate patterns in which the edges of respective pairs of apertures 31 for detectors 25 in successive rows of the array 23 are aligned in the cross scan direction for a so-called fully sampled application. It should, however, be understood that the apertures 31 may be paired in overlapping edge alignment for over sampling or in spaced apart edge alignment for under sampling.

Figure 6:
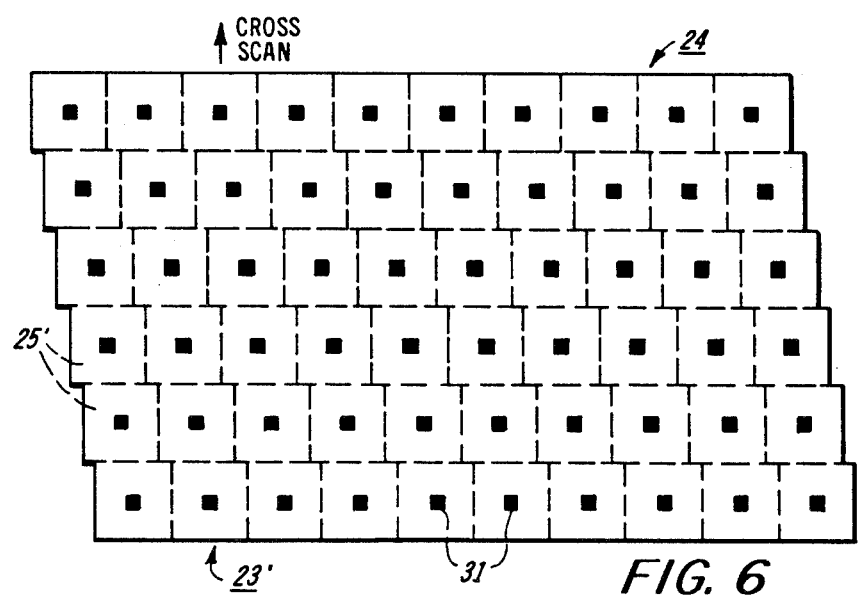
Figure 7:
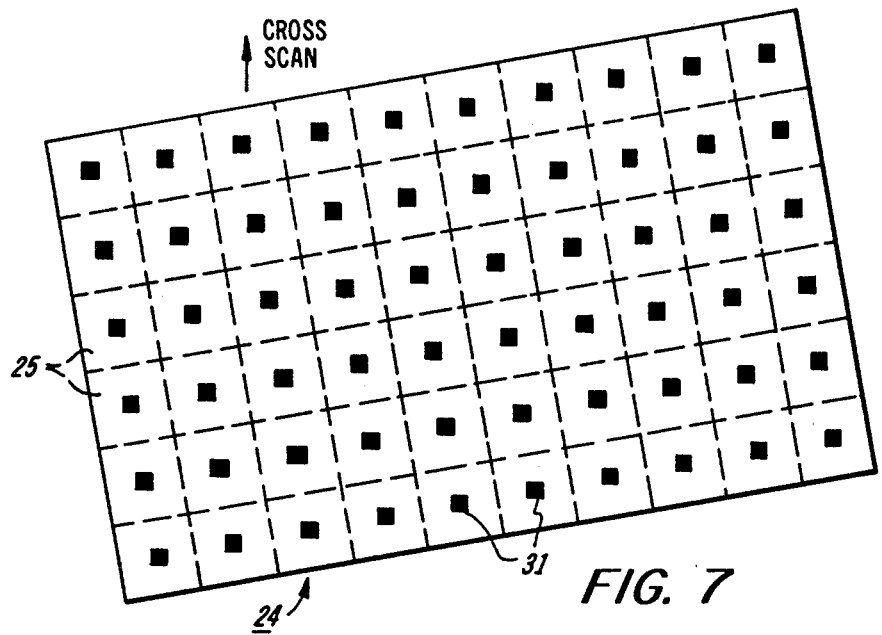

A common disadvantage of using a simple rectangular array 23 of CCD detectors 25 such as shown in FIGS. 1 and 2, is that some of the pixels of each scan line are likely to be imaged onto certain of the detectors 25 in regions or zones which are too close to the detector boundaries. However, that problem may be avoided, as shown in FIG. 6, by laterally staggering the detectors 25' in the successive rows of the array 23' so that the photosensitive zones are generally centered on the detectors 25' despite the lateral staggering of the apertures 31. Alternatively, as shown in FIG. 7, a rectangular CCD detector array 23 may be canted or tilted relative to the cross scan direction to more or less center the staggered apertures 31 on the individual detectors 25. In that event, pixels from multiple scan lines of the subject may be simultaneously imaged onto each row of detectors 25, but that does not alter the basic concept.

Figure 8:
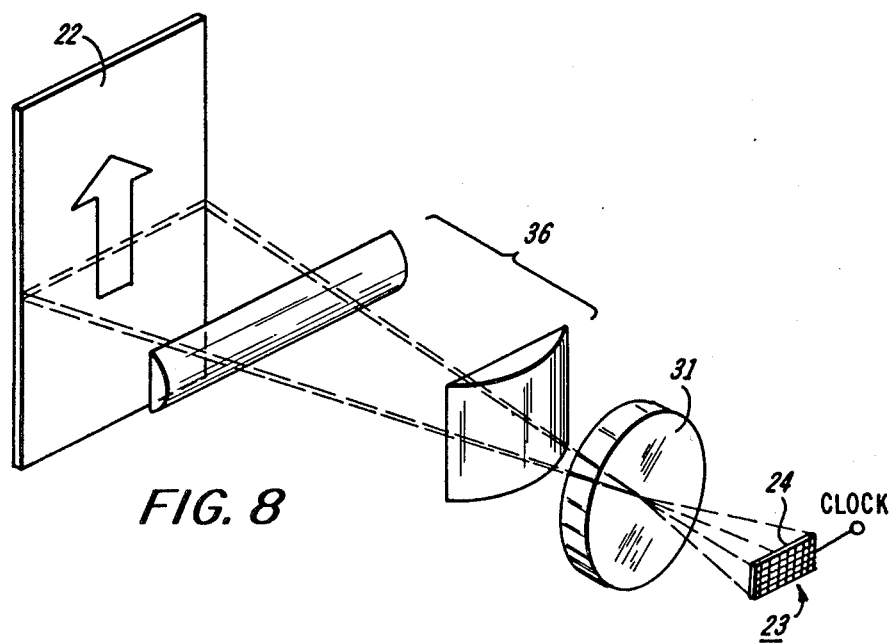
FIG. 8 is a schematic diagram of still another embodiment of the present invention.

Referring to FIG. 8, to reduce the number of frames which are required to accumulate a complete set of data samples for a scan line, anamorphoric optics 36 having greater magnification in the cross scan direction than in the line scanning direction may be used for imaging the subject 22 onto the array 23. The complete optical system, including the lens 31 and the optics 36, is suitably selected so that cross scan height of each scan line imaged onto the array 23 is in a range anywhere between a cross scan height equal to the line scan pixel spacing (the nonanamorphic use) and a cross scan height equal to the height of the entire array 23. In the example shown in FIG. 8, the cross scan or vertical height of each scan line is equal to the cross scan height of the array 23 per row of detectors 25. It will, of course, be understood that it becomes increasingly difficult to achieve the f/numbers needed for high speed scanning as the anamorphic ratio of the optical system is increased.

As will be appreciated, the line scanning resolution cannot be increasing indefinitely simply by adding additional rows of detectors 25 to the array 23. In an integrated array 23, the number of rows n of detectors 25 is subject to the aforementioned limitations on state of the art semiconductor fabrication techniques. However, the line scanning resolution which can be achieved is generally even more restrictively limited since each of the detectors 25 requires a photosensitive zone of at least a certain minimum area to provide sufficient photosensitive response at typical illumination levels.

Figure 9:
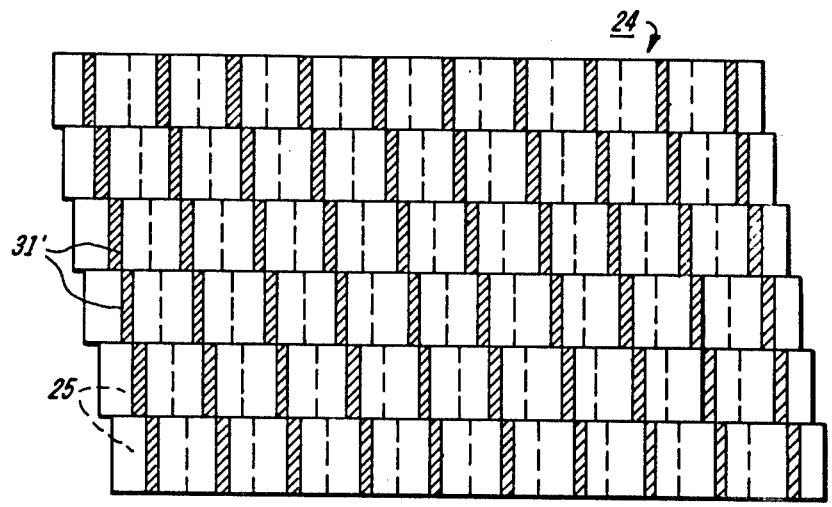
FIG. 9 is a layout diagram of a staggered aperture mask which is suitable for use in the embodiment shown in FIG. 7.

Turning to FIG. 9, one of the additional advantages of anamorphically imaging the successive segments of the subject 22 is that the areas of the photosensitive zones of the detectors 25 may be anamorphically enlarged in the cross scan direction, such as by providing the mask 24 with anamorphic apertures 31'. Preferably, the anamporhic ratio of the photosensitive zones of the detectors 25 is related to the anamporphic ratio of the optics 31, 36, up to a limit determined by the cross scan height of the individual detectors 25. That miximizes the area per unit width of the photosensitive zones of the detectors 25, while ensuring that each of the detectors 25 responds to only one pixel per scan line.

The present invention may be applied to raster input scanning if suitable provision is made for assembling the data samples generated by the detectors 25 in a serial video data stream having a scan line-by-scan line format. As previously mentioned, the pixels of each scan line are distributed to the individual detectors 25 of the array 23 in accordance with a two dimensional distribution function. If only one scan line is imaged onto the array 23 per frame, the detectors 25 simultaneously generates data samples for the same scan line. In that case, it is merely necessary to provide suitable destaggering means for assembling the data samples for each scan line in accordance with the inverse of the aforementioned distribution function. If, however, multiple scan lines are simultaneously imaged onto the array, the destaggering means must be buffered. The minimum data sample storage capacity, M, required for that buffering is given by:

$$M = N[x/n - 1 + 1][(n-1) + (n-2) + \ldots + 1]$$

Where:

N = the number of detectors 25 per row in the array 23;

X = the total number of undetected scan lines imaged onto the array 23 between the uppermost and lowermost rows of detectors 25; and n = the number of rows in the array 23.

Figure 10:
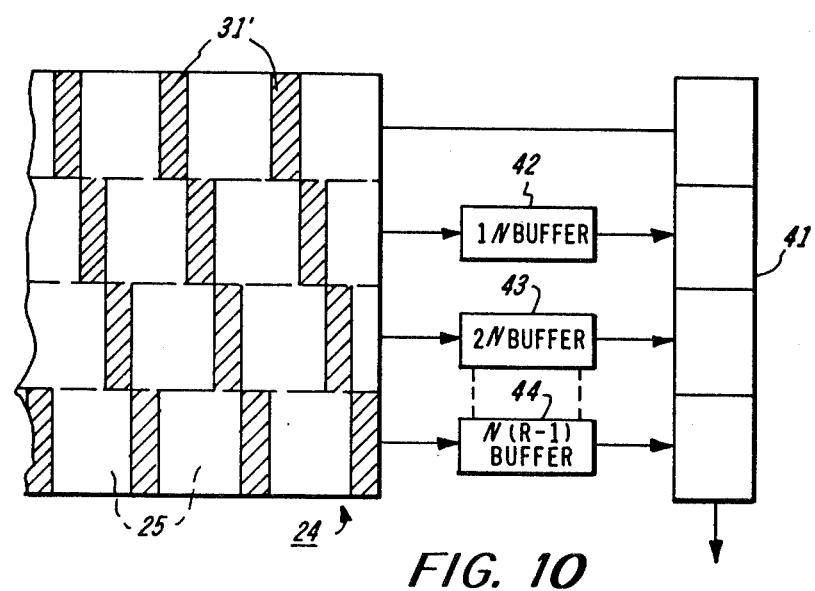
FIG. 10 is a functional block diagram of buffered destaggering electronics for carrying out raster input scanning when the masks of FIG. 9 is used in the embodiment of FIG. 8.

Referring to FIG. 10 there is a functional block diagram of a buffered destaggering circuit which may be used to provide a video data stream having a raster scanning format if (1) the photosensitive zones of the detectors 25 are progressively staggered and (2) n scan lines are imaged onto the array per frame (i.e., x=0). In this instance, it is assumed that the data samples generated by the detectors 25 in the successive rows of the array 23 are serially shifted along the respective rows and out of the array in parallel, with each row being read out at the line scanning or framing rate. Data samples from the last or uppermost row of detectors 25 are serially shifted into the last stage of a n stage parallel input/serial output shift register 41, but the data samples from the other rows of detectors 25 are shifted into other stages of the register 41 via buffer registers 42–44, respectively, of progressively increasing length. Specifically, N additional stages are added to the registers 42–44 for each succeeding row in the array 23. Thus, the buffer register 42 for the next to last row of detectors 25 has N stages, while the buffer register 44 for the first or bottommost row of detectors 25 has N(n−1) stages.

Turning to FIG. 11, an extended CCD array 51 may be used to carry out the image detection function and the buffered destaggering function. Moreover, the extended array 51 may be integrated on a single semiconductor chip, provided that the required CCD element count does not exceed the capabilities of state of the art fabrication techniques. For example, as shown, if n scan lines are imaged onto a n×N image detection segment 52 of the array 51 per frame via a mask 24 having progressively staggered apertures 31, a suitable shift sequence for assembling the data samples for a given scan line in adjacent sample serial order is:

1. Shift all data samples down n rows per frame;
2. Shift the n+1, 2n+2, ... nn+n rows one stage to the left (it should be noted that each of those rows contain N+1 CCDs as opposed to the others which contain only N CCD's);
3. Shift the contents of the leftmost stages of the n+1, 2n+2, ... nn+n rows down N elements;
4. Repeat steps 2 and 3, n−1 additional times/frame to empty the n+1, 2n+2 and nn+n rows; and
5. Go back to step 1 to start assembling the data samples for the next scan line.

CONCLUSION

In view of the foregoing, it will be seen that the present invention provides methods and means for achieve high resolution input scanning, including raster input scanning, through the use of a low resolution, two dimensional, photosensitive detector array, such as a CCD area array. Furthermore, it will be understood that this invention may be used for scanning a variety of subjects, such as printed or handwritten documents, graphics, photographs, or even real scenes.

Various alternatives to and modifications of different aspects of the invention have been described, but others will suggest themselves.

I claim:

1. An input scanner comprising the combination of a two dimensional array of photosensitive detectors, said detectors having respective photosensitive zones which are laterally offset from one another in a line scanning direction;
means for sequentially imaging successive scan line length segments of a subject onto said array at a predetermined framing rate as said subject moves in a cross scan direction relative to said array, whereby said detectors sequentially generate data samples representing respective pixels of successive scan lines; and
means coupled to said array for reading said data samples out of said detectors at said framing rate.

2. The input scanner of claim 1 further including means for assembling the data samples read out of said detectors in a serial data stream having a raster scanning format 3. The input scanner of claim 1 further including a staggered aperture mask interposed between said subject and said array for laterally offsetting the photosensitive zones of said detectors.

4. The input scanner of claim 3 wherein the photosensitive zone of each detector is generally centered on the detector.

5. The input scanner of claim 1 wherein said detectors are photosensitive devices integrated on a single chip of semiconductor material.

6. The input scanner of claim 5 further including a staggered aperture mask interposed between said subject and said array for laterally offsetting the photosensitive zones of said detectors.

7. The input scanner of claim 6 wherein said staggered aperture mask is deposited on and supported by said array.

8. The input scanner of claim 6 wherein said staggered aperture mask is a free standing component, and said imaging means further includes relay optics for imaging said mask onto said array.

9. The input scanner of claim 1 wherein each of said segments of said subject comprises a predetermined plurality of scan lines, and further including buffered destaggering means coupled to said detectors for assembling the data samples read out of said detectors in a serial video data stream having a raster scan format.

10. The input scanner of claim 9 wherein said detectors and said buffered destaggering means comprise respective pluralities of charged coupled devices integrated on a single chip of semiconductor material.

11. The input scanner of claim 9 further including an optically opaque mask interposed between said subject and said array, said mask having a two dimensional pattern of optically transparent apertures for transmitting light from said subject to respective ones of said detectors, said apertures being laterally offset from one another in the line scanning direction to define the laterally offset photosensitive zones of said detectors.

12. The input scanner of claim 1 wherein each of said segments of said subject comprises a predetermined number of scan lines, and said subject advances in a cross scan direction to said array at a rate of one scan line per frame.

13. The input scanner of claim 12 wherein said imaging means further includes anamorphic optics having greater power in said cross scan direction than in said line scanning direction, said optics having an anamorphic ratio selected to cause each of said scan lines to have a cross scan height greater than the width of any of said pixels in the line scanning direction.

14. The input scanner of claim 13 wherein the photosensitive zones of said detectors are elongated in the cross scan direction to provide said detectors with increased sensitivity per unit width of said photosensitive zones as measured in said scanning direction.

15. The input scanner of claim 14 further including means coupled to said detectors for assembling the data samples read out of said detectors in a serial video data stream having a raster scan format.

16. The input scanner of claim 15 wherein each of said segments of said subject comprises a predetermined multiple number of scan lines, and said means for assembling said samples comprises buffered destaggering means for accumulating said samples at said framing rate and for serially outputting said samples in accordance with said raster scan format.

17. The input scanner of claim 1 wherein said array comprises multiple rows of detectors, each of said segments of said subject comprises a predetermined number of scan lines, and said subject advances in said cross scan direction relative to said array at a rate of one scan line per frame.

18. The input scanner of claim 17 wherein said array is rectangular and is titled relative to the cross scan direction at an angle selected to cause said lateral staggering of the photosensitive zones of said detectors.

19. The input scanner of claim 18 further including buffered destaggering means coupled to said detectors for assembling said data samples in a serial video data stream having a raster scan format.

20. The input scanner of claim 18 further including a staggered aperture mask interposed between said subject and said array to define said photosensitive zones, said mask having progressively staggered optically transparent apertures for laterally progressively offsetting said photosensitive zones in the line scanning direction.

21. The input scanner of claim 20 further including buffered destaggering means coupled to said detectors for assembling said data samples in a serial video data stream having a raster scan format.

22. An input scanner comprising the combination of a two dimensional image sensor having a plurality of photosensitive zones which are laterally offset from one another in a line scanning direction;
means for sequentially imaging successive scan line length segments of a subject onto said image sensor at a predetermined framing rate as said subject moves in a cross scan direction relative to said image sensor, whereby said photosensitive zones sequentially generate data samples at said frame rate, said data samples representing respective pixels of successive scan lines of said subject; and
means for reading said data samples out of said image sensor at said framing rate.

23. The input scanner of claim 22 further including a staggered aperture mask interposed between said subject and said image sensor for defining said photosensitive zones.

24. The input scanner of claim 23 wherein said mask is deposited on and supported by said image sensor.

25. The input scanner of claim 23 wherein said mask is a free standing member, and further including relay optics for relay imaging said mask onto said image sensor.

26. The input scanner of claim 23 wherein said subject is advanced relative to said image sensor at a rate of one scan line per frame, and each of said segments includes multiple scan lines of said subject; and further including buffered destaggering means coupled to said image sensor for formatting said data samples into a serial video data stream having a raster scan format.

27. The input scanner of claim 26 wherein said imaging means is anamorphic with greater magnification in the cross scan direction than in the line scanning direction, whereby said segments of said subject are anamorphically imaged onto said image sensor.

28. An input scanning method comprising the steps of
imaging successive scan line length segments of a subject onto a two dimensional image sensor at a predetermined framing rate as said subject moves in a cross scan direction relative to said image sensor, said image sensor having a plurality of photosensitive zones which are laterally staggered relative to one another in a line scanning direction, whereby data samples representing respective pixels of said subject are generated at said framing rate; and
reading said data samples out of said image sensor at said framing rate.

* * * * *